US005474494A

United States Patent [19]
Sims

[11] Patent Number: 5,474,494
[45] Date of Patent: Dec. 12, 1995

[54] FISH CLEANING APPARATUS

[76] Inventor: Ralph W. Sims, 433 Belmont Dr., Edmond, Okla. 73034

[21] Appl. No.: 214,115

[22] Filed: Mar. 17, 1994

[51] Int. Cl.[6] ................................................. A22C 25/06
[52] U.S. Cl. ............................ 452/194; 452/185; 269/13; 269/302.1
[58] Field of Search ..................... 452/105, 194, 452/195, 196, 101, 98, 185; 269/289 R, 302.1, 13, 15; 220/324, 353, 354

[56] References Cited

U.S. PATENT DOCUMENTS

| | | | |
|---|---|---|---|
| 1,000,073 | 8/1911 | Clarke | 452/105 |
| 2,179,758 | 11/1939 | Schlueten | 452/105 |
| 3,248,751 | 5/1966 | Wilborn | 452/105 |
| 3,526,925 | 9/1970 | Mason | 452/194 |
| 3,785,008 | 1/1974 | Parker | 452/195 |
| 3,833,967 | 9/1974 | Kieser | 452/194 |
| 4,041,964 | 8/1977 | Shamoon | 269/302.1 |
| 4,229,858 | 10/1980 | Baxter et al. | 452/194 |
| 4,454,628 | 6/1984 | Olson | 269/296 |
| 4,653,737 | 3/1987 | Haskins et al. | 269/15 |
| 4,907,789 | 3/1990 | Tice | 269/13 |
| 4,935,991 | 6/1990 | Tourney | 452/194 |

FOREIGN PATENT DOCUMENTS 2579074  9/1986  France ................................ 452/194

Primary Examiner—Willis Little

[57] ABSTRACT

A fish cleaning apparatus for use with a container having upper edge portions which defines a mouth of the container includes a platform having upper and lower surfaces and an opening formed in the platform. Grooves are formed in the lower surfaces of the platform adjacent to the opening for receiving the mouth of the container where the mouth of the container is inserted into the grooves and latch elements are positioned adjacent to the grooves for engaging the container and for releasably locking the mouth of the container in the grooves. Sidewalls are connected to the upper surface of the platform for containing fish debris on the platform while fish are being cleaned and pivotal second sidewalls are connected to the upper platform for use in sweeping the debris toward the opening. A removable blade device is positioned adjacent the opening for use in cleaning fish. Telescoping members are positioned on the lower surface of the platform for use in securing the platform on containers having different dimensions of mouths or openings.

12 Claims, 4 Drawing Sheets

FISH CLEANING APPARATUS

BACKGROUND OF THE INVENTION

1. Field of the Invention

The present invention relates generally to fish cleaning devices and more particularly to fish cleaning devices for use in conjunction with a container.

2. Description of the Prior Art

Fish cleaning devices are known in the prior art. For example, U.S. Pat. No. 3,445,885 discloses a fish holding device where fish are supported on base plate and U.S. Pat. No. 3,526,925 discloses a convertible fish cleaning and kitchen board device where fish are secured to the board with a clamping device. U.S. Pat. No. 3,590,423 discloses a fish cleaning device which may be attached to the gunwale of a fishing boat. Further, U.S. Pat. Nos. 3,713,189, 3,785,008, and 3,833,967 disclose fish cleaning devices in which fish are clamped to the upper surfaces of the devices. U.S. Pat. No. 4,229,858 discloses a boat-mountable fish cleaning tray, U.S. Pat. No. 4,454,628 discloses a fish cleaning table for use where it is suspended from a sink and U.S. Pat. No. 4,531,260 discloses a fish filleting kit where the container for the kit functions as a cleaning surface. Still other fish cleaning apparatus are disclosed in U.S. Pat. No. 4,935,991 which shows a fish cleaning station and U.S. Pat. No. 5,116,279 which shows a folding table that is used for cleaning fish.

While some of the foregoing fish cleaning devices are provided with leg structures for supporting the devices from various structures, the present invention is generally directed to a fish cleaning apparatus which may be connected to a trash container so that it may be readily moved to other locations and which may be readily used in unstable environments, such as aboard a small fishing boat.

SUMMARY OF THE INVENTION

To achieve the foregoing and other advantages, the present invention, briefly described, provides a portable fish cleaning device having a platform with upper and lower surfaces and an opening formed therein. Grooves are formed in the lower surface of the platform generally adjacent to and generally encompassing the opening for receiving the mouth of a container that is inserted into a respective groove and locked in place with the use of pivoting locking elements that engage the container. Telescoping members in the form first and second elongated members may be pivotally and releasably secured to the lower surface of the platform for securing the platform to containers having wide mouths or other support structures. First sidewalls may be secured to the upper surface of the platform for containing fish debris upon the platform so that it can be disposed of by sweeping the debris through the opening and into a container. Pivotal second sidewalls may be pivotally secured to the first sidewalls and positioned generally parallel to the upper surface for pivotal movements across the upper surface of the platform toward and away from the opening for sweeping fish debris into the opening.

The above brief description sets forth rather broadly the more important features of the present invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent construction insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved fish cleaning apparatus which has all of the advantages of the prior art and none of the disadvantages.

It is another object of the present invention to provide a new an improved fish cleaning device which may be easily and efficiently manufactured and marketed.

It is a further objective of the present invention to provide a new and improved fish cleaning apparatus device which is of durable and reliable construction.

Still yet a further object of the present invention is to provide a new and improved fish cleaning apparatus which is designed to provide efficient cleaning of fish in different environments of use and which can be stored in an efficient manner when not in use.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

Figure 1:
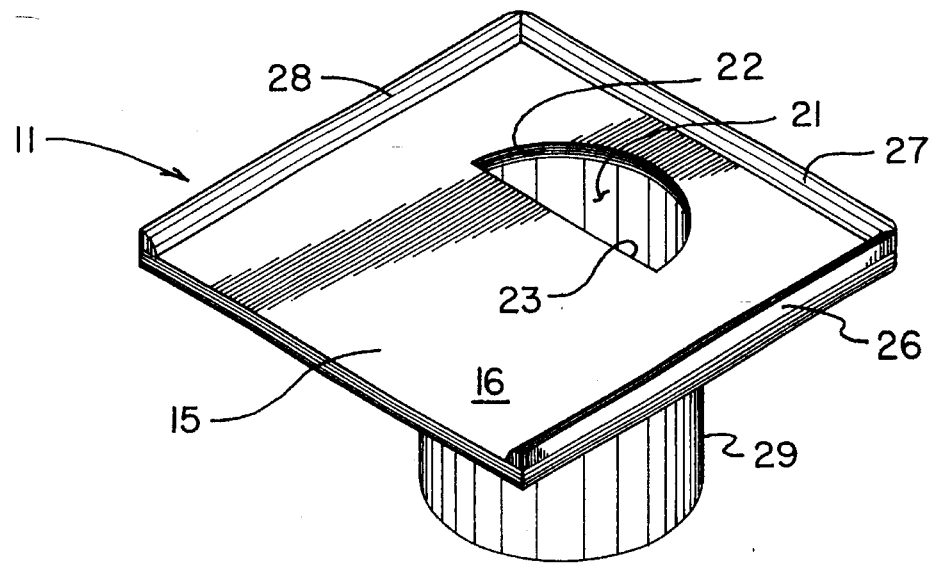
FIG. 1 is top view of a fish cleaning device constructed according to the present invention and mounted on a container for receiving debris.

With reference now to the drawings, a new and improved fish cleaning apparatus embodying the principles and concepts of the present invention will be described.

Referring now to the drawing figures, there is generally shown a fish cleaning apparatus 11 constructed according to the present invention. The fish cleaning device includes a platform 15 of generally planar configuration having upper and lower surfaces 16, 17 and an opening 21 formed therein. The opening 21 of FIGS. 1, 2, 4, and 9 is generally defined by an arcuate edge portion 21 and a straight edge portion 22 formed in the platform.

The upper surface 16 of the platform 15 in FIG. 1 may be provided with one or more sidewalls 26, 27, 28 to retain the fish debris on top of the platform while the fish are being cleaned and the fish debris are then swept off the platform through the opening into a trash or debris container 29.

Figure 2:
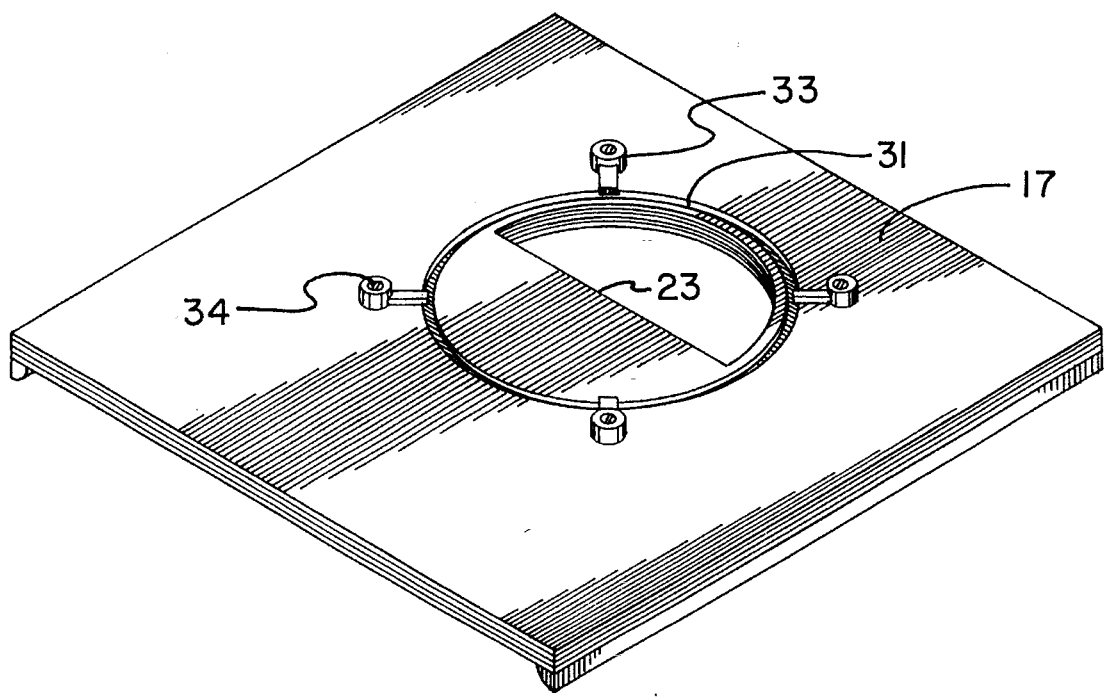
FIG. 2 is a bottom view of the fish cleaning apparatus.
Figure 3:
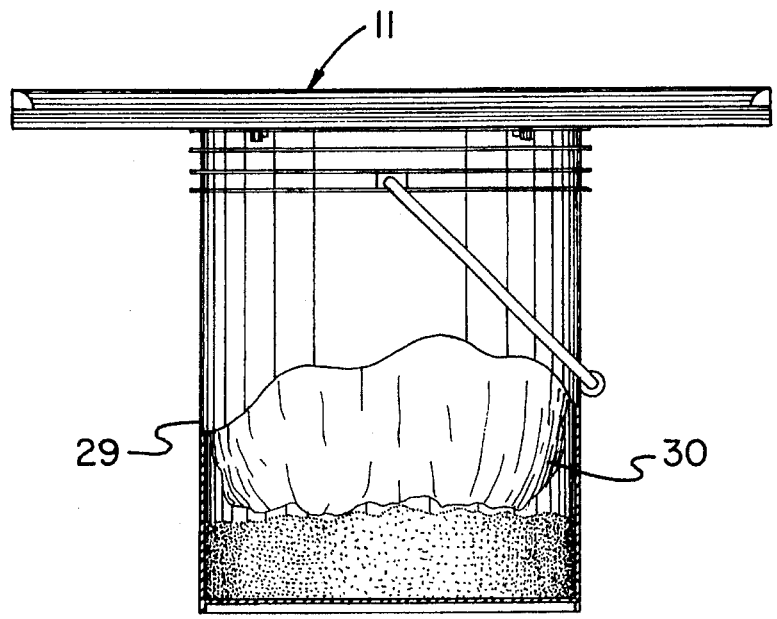
FIG. 3 a side view of the fish cleaning apparatus mounted on a container as shown in FIG. 1.

FIG. 2 depicts the lower surface of the fish cleaning device 11. The lower surface 17 is provided with a continuous circular groove 31 which encompasses the opening and a plurality of locking members 33 which are pivotally connected to the bottom of the platform by screws 34. The circular groove 31 is designed to receive the upper edge portions or mouth of a small container 29 and when the mouth of the container is inserted into the circular groove 31 the locking members are rotated to engage the container 29. When assembled, with the platform mounted on the container 29, the apparatus will have a general configuration as shown in FIG. 3. An example of a container particularly well suited for use with the platform are five(5)-gallon plastic containers for drywall or joint compound. For example, Georgia Pacific, Gold Bond Industries and U.S. Gypsum all market joint compound in five gallon containers which have been found suitable for mounting the platform on the containers. These type of containers generally have an upper edge or lip portions which are rolled or curved outwardly to define a circumferential flange designed to receive inwardly directed flanges on the plastic covers for the sealing the containers. For this type of container, the locking members are rotated to engage the upper edge or lip of the container to prevent the mouth of the container from separating from the grooves formed in the platform. In use, as shown in FIG. 2, the container 29 is filled with sand, rocks or other ballast to reduce the tendency of the container to tip during use and a plastic bag 30 is inserted into the container so that a portion of the walls of the bag are draped over the mouth of the container. Thus, when the platform is locked onto the container, the fish debris which is dumped through the opening in the platform will fall totally within the bag 30. While only one groove is shown in FIG. 2, it is understood that a plurality of different size grooves and removable locking members may be provided for containers having different size of mouth dimensions.

It will be appreciated that it is within the contemplation of the invention to support the platform on containers having various sized openings or mouths. Any suitable adjustable support means for this purpose may be employed such as, for example, additional fastening means (not shown) in the form of a pair of telescoping elongated members which are removably and pivotally connected to the lower surface of the platform by way of a threaded fastener, respectively, and which advantageously may be used to serve this function. Thus, with irregular or wider size containers the telescoping members can be extended to engage the walls of the container or rest on the open top edge of the wider mouth container or other support surface.

Figure 4:
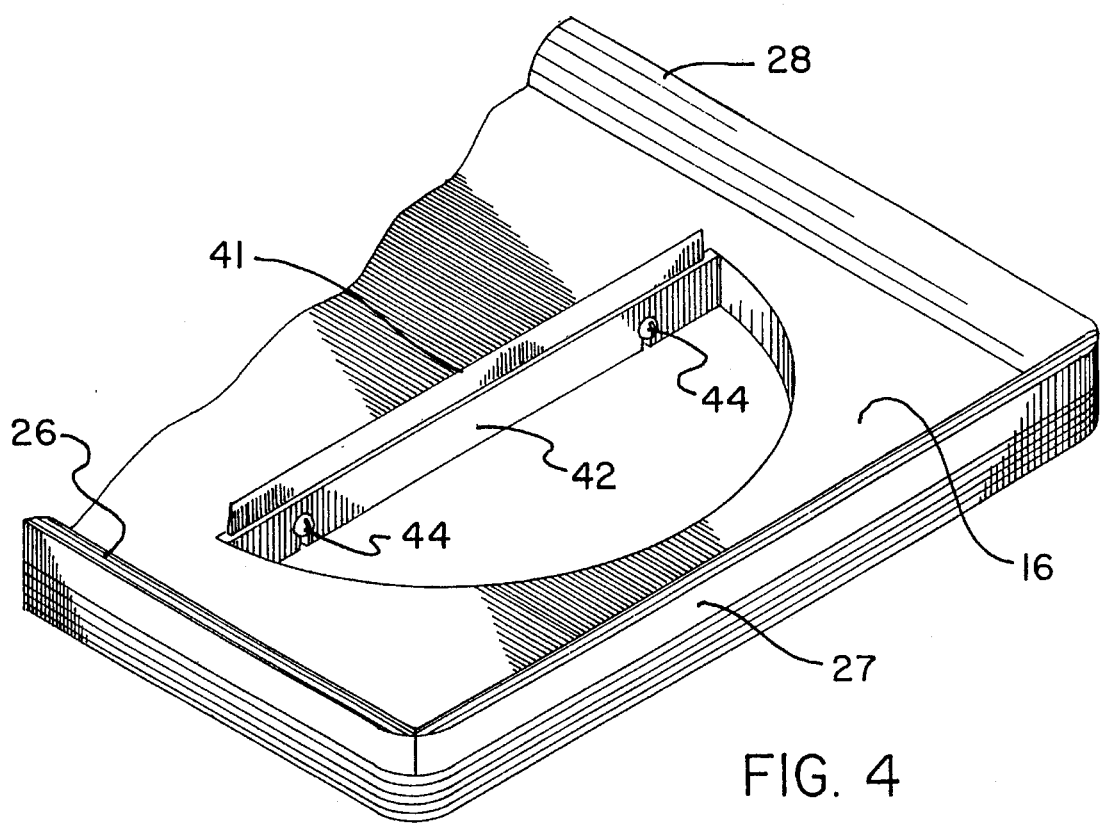
FIG. 4 is a view of a blade and blade holder mounted in operative position in the opening formed in the fish cleaning device.
Figure 5:
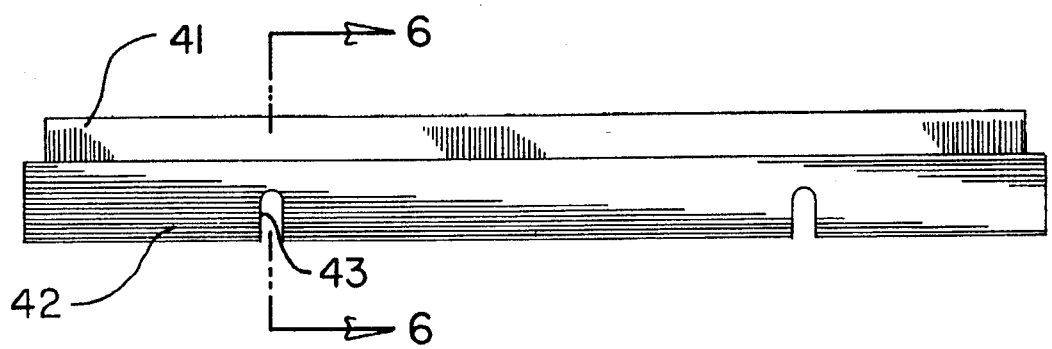
FIG. 5 is a side view of a knife blade and holder for the knife blade.
Figure 6:
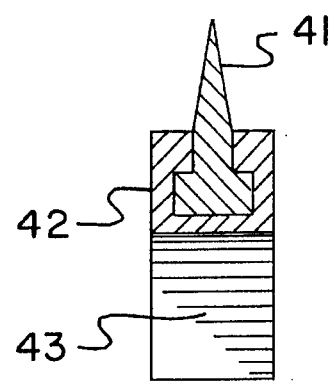
FIG. 6 is a section view taken generally along lines 6—6 of FIG. 5.
Figure 7:
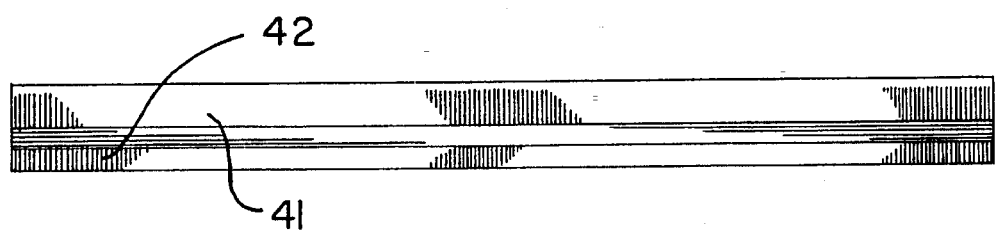
FIG. 7 is a top view of the knife blade and holder of FIG. 5.
Figure 8:
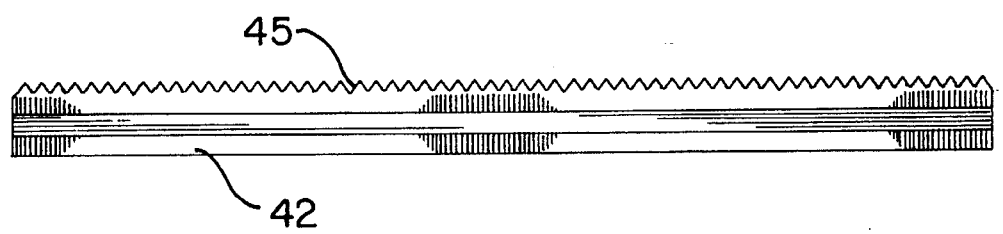
FIG. 8 is a side view of serrated blade mounted in a blade holder.

A removable blade means in the form of a blade holder 42 and blade element 41 are shown in FIGS. 4–8. As depicted in FIGS. 5 and 6, the knife blade 41 is removably inserted in the blade holder 42 and the blade holder is then mounted on the platform by aligning the openings 43 in the holder 42 onto the threaded elements 44 that, as shown in FIG. 4, are secured to the straight edge portion of the platform that partially defines the opening 21 in the platform. The threaded elements 44 are then tightened to secure the blade holder 42 in a fixed position relative to the platform. For different uses, other types of blade elements such as the serrated blade element 45 shown in FIG. 8 may be readily inserted into the holder 42 and mounted on the platform. In those situations where the blade element is particularly sharp, the sidewalls 26 may be constructed to project further from the platform than the blade element to reduce the likelihood that the blade will contact or scratch other objects, if for example the platform is inverted and laid on the ground with the blade attached.

Figure 9:
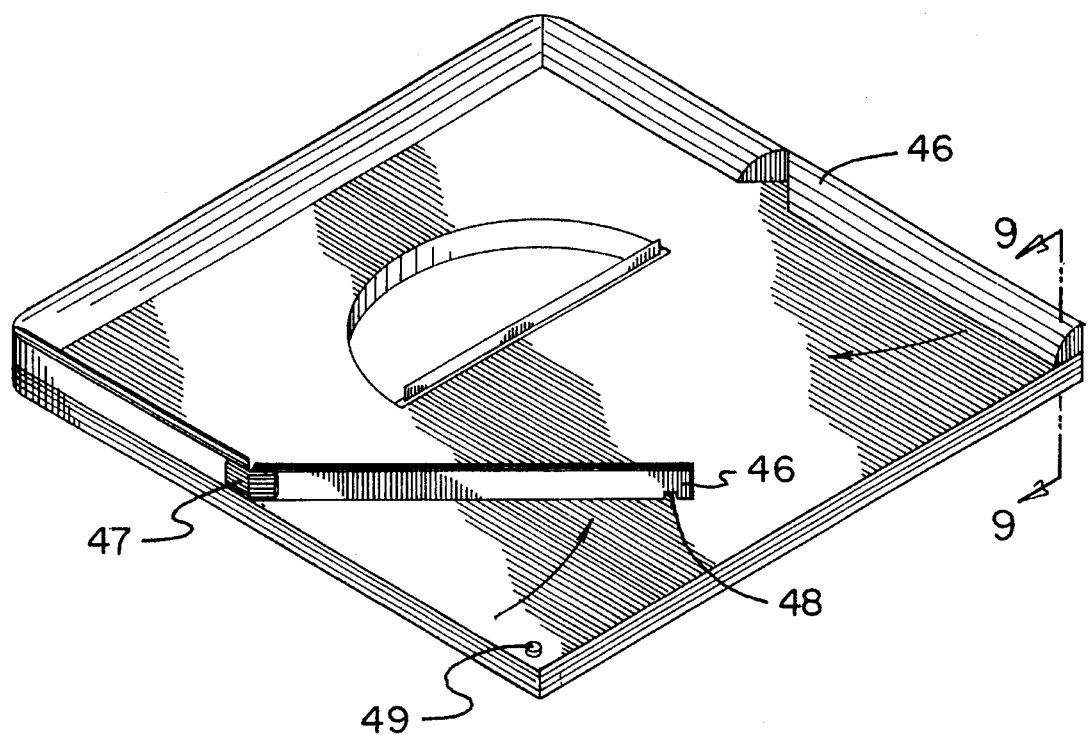
FIG. 9 is a top perspective view illustrating the manner in which the debris may be swept toward an opening.
Figure 10:
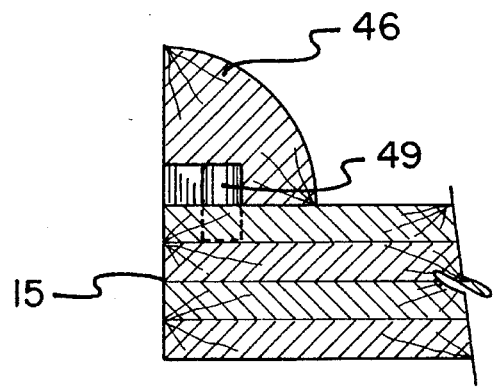
FIG. 10 is a section view taken generally along lines 10—10 of FIG. 9.

Additional means for assisting in the cleaning of fish are shown in FIGS. 9 and 10 where a second set of elongated sidewall members 46 are pivotally connected to the first sidewalls 26 at pivotal connection 47. The second sidewalls 46 comprise elongated members which are pivotally connected to the first sidewalls at one end portion and they are positioned generally parallel to the upper surface of the platform for pivotal movements across the upper surface of the platform toward and away from the opening for sweeping fish debris toward the opening. Latch means in the form of pin elements 49 releasably engage recessed portions 48 formed in the second sidewalls 46 for holding the second sidewalls in a fixed position.

While the present invention has been shown in the drawings and fully described above with particularity and detail in connection with what is presently deemed to be the most practical and preferred embodiments of the invention, it will be apparent to those or ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A portable fish cleaning apparatus for use with a container having upper edge portions which define a mouth of a container, comprising:

a platform means for positioning on top of a container such that the platform means is supported in a spaced relationship relative to a supporting surface by said container, said platform means comprising a platform having upper and lower surfaces and an opening formed therein, groove means formed in the lower surface of the platform generally adjacent to the opening formed in the platform for receiving a mouth of the container so that when the platform is placed on container at least a portion of the upper edge of the container is inserted in the grooves for preventing the platform from slipping off the container when the apparatus is used for cleaning fish; and locking means connected to the lower surface of the platform generally adjacent to the grooves for engaging the container for releasably securing the platform to the container, said apparatus further comprising:

second sidewall means pivotally connected to the first sidewall means, the second sidewall means comprising elongated members which are positioned generally parallel to the upper surface of the platform and pivotally connected at one end portion to the first sidewall means for pivotal movements across the upper surface of the platform toward and away from the opening formed in the platform for sweeping fish debris into the opening.

2. The apparatus according to claim 1, further comprising:

latch means connected to the upper surface of the platform for engaging the other end portion of the second sidewall means for releasably latching the elongated members of the second sidewall means in a fixed position.

3. The apparatus according to claim 1, further comprising:

blade means removably secured to the platform adjacent to the opening formed in the platform so that the blade means projects from the platform for use in cleaning fish; and connecting means secured to the platform and releasably connected to the blade means for removably securing the blade means to the platform.

4. The apparatus according to claim 3, wherein the blade means comprises an elongated blade element and an elongated holder for the blade element, wherein the blade element is inserted into the holder and the holder is provided with spaced openings for receiving the connecting means in the form of threaded elements which are inserted into the platform.

5. The apparatus according to claim 1, wherein the groove means includes a circumferential groove which encompasses the opening formed in the platform for receiving the upper edge portions of a container so that the mouth of the container is fully inserted into the circumferential groove.

6. The apparatus according to claim 5, wherein the fastening means comprise elongated locking members pivotally secured to the lower surface of the platform so that the locking members can be pivoted to engage the trash container and locked in place to hold the platform onto the trash container.

7. A portable fish cleaning apparatus for use with a container having upper edge portions which define a mouth of the container, comprising:

a platform having upper and lower surfaces and an opening formed therein;

first sidewall means connected to the upper surface of the platform generally adjacent to the opening formed in the platform for containing the fish debris on the platform;

second sidewall means pivotally connected to the first sidewall means, the sidewall means comprising elongated members which are positioned generally parallel to the upper surface of the platform and pivotally connected to the first sidewalls for pivotal movements across the upper surface of the platform toward and away from the opening formed in the platform for sweeping fish debris into the opening;

blade means removably secured to the platform adjacent to the opening for assistance in cleaning the fish;

connecting means secured to the platform and the blade means for removably securing the blade means to the platform;

groove means formed in the lower surface of the platform generally adjacent to the opening for receiving the mouth of a container; and locking means connected to the lower surface of the platform for securing the platform to the container.

8. The apparatus according to claim 7, wherein the container comprises a bucket having a circular mouth and the groove means includes a continuous circular groove for receiving the mouth of the bucket.

9. A portable fish cleaning apparatus for use with a trash container having upper edge portions which define a mouth of a container, comprising:

a platform means for positioning on top of a container such that the platform means is supported in a spaced relationship relative to a supporting surface by said container, said platform means comprising a platform having upper and lower surfaces and an opening formed therein;

groove means formed in the lower surface of the platform generally adjacent to the opening formed in the platform for receiving a mouth of a container so that when the platform is placed on a container at least a portion of the top edge of the container is inserted in the groove means for preventing the platform from slipping off the container when the apparatus is used for cleaning fish, wherein the groove means includes a circumferential groove which encompasses the opening formed in the platform for receiving the upper edge portions of a container so that the mouth of the container is fully inserted into the circumferential groove;

locking means connected to the lower surface of the platform generally adjacent to the groove means for engaging the container for releasably securing the platform to the trash container, wherein the locking means comprise elongated locking members pivotally secured to the lower surface of the platform so that the locking members can be pivoted to engage the container and locked in place to hold the platform onto the container.

10. The apparatus according to claim 9, further comprising:

blade means removably secured to the platform adjacent to the opening formed in the platform so that the blade means projects from the platform for use in cleaning fish; and connecting means secured to the platform and releasably connected to the blade means for removably securing the blade means to the platform, wherein the blade means comprises a blade element and a holder for the blade element and wherein the blade element is inserted into the holder and the holder is provided with spaced openings for receiving the connecting means in the form of threaded elements which are inserted into the platform.

11. The apparatus according to claim 10, further comprising:

first sidewall means connected to the upper surface of the platform generally adjacent to the opening formed in the platform for containing fish debris within the upper surface of the platform; and second sidewall means pivotally connected to the first sidewall means, the second sidewall means comprising elongated members which are positioned generally parallel to the upper surface of the platform and pivotally connected at one end portion to the first sidewall means for pivotal movements across the upper surface of the platform toward and away from the opening formed in the platform for sweeping fish debris toward the opening.

12. The apparatus according to claim 11, further comprising:

latch means connected to the upper surface of the platform for engaging the other end portion of the sidewall means for releasably latching the elongated members of the second sidewall means in a fixed position.

* * * * *